H. C. LOVIS.
CUSPIDOR.
APPLICATION FILED SEPT. 12, 1910.
1,015,046.
Patented Jan. 16, 1912.
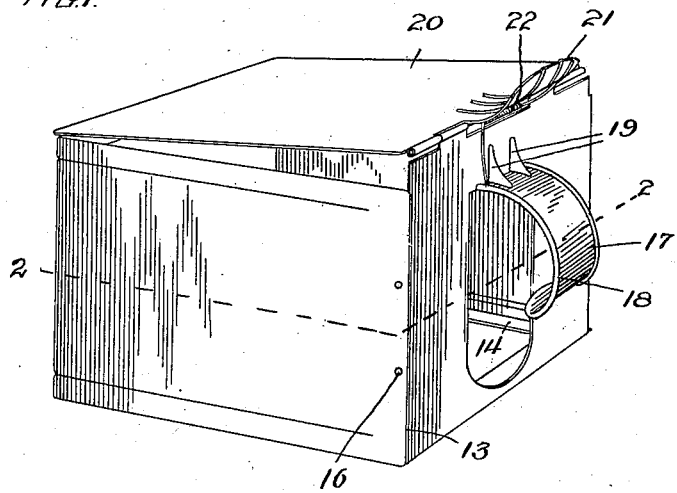
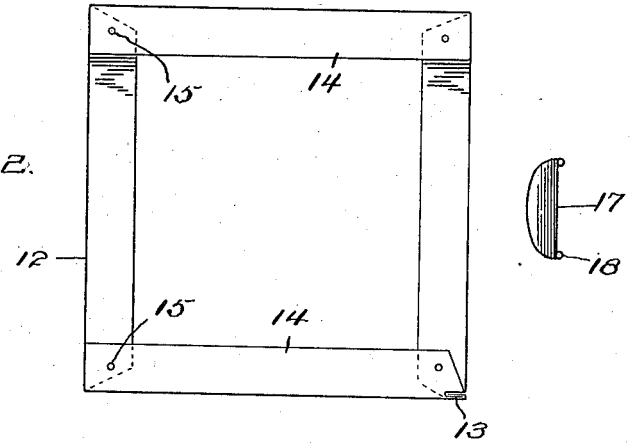
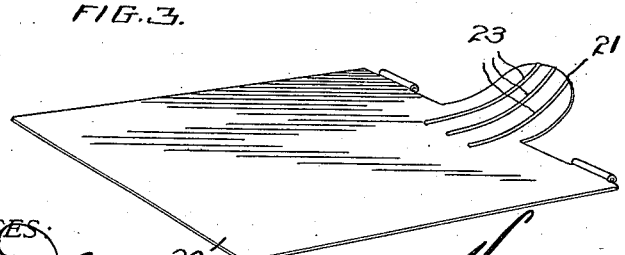

UNITED STATES PATENT OFFICE.

HENRY C. LOVIS, OF NEW YORK, N. Y., ASSIGNOR TO SEABURY & JOHNSON, A CORPORATION OF NEW JERSEY.

CUSPIDOR.

1,015,046. Specification of Letters Patent. Patented Jan. 16, 1912.

Application filed September 12, 1910. Serial No. 581,546.

*To all whom it may concern:*

Be it known that I, HENRY C. LOVIS, a citizen of the United States, residing at New York, in the county of New York and State of New York, have invented or discovered certain new and useful Improvements in Cuspidors, of which the following is a specification, reference being had therein to the accompanying drawings.

This invention relates to that class of cuspidors comprising a light metal frame or holder and a removable receptacle of paper or other suitable material; and the invention has for its object to provide a frame or holder which may be more cheaply manufactured than similar holders heretofore known, but which will be as efficient and convenient as the similar holders now generally in use.

To this end the improved holder, which is square or rectangular in shape and is provided with a suitable handle, consists, handle and all, of a single piece of thin sheet metal bent into proper shape, the handle consisting of an integral part of the holder and being struck out therefrom, and provided with integral strengthening ribs. The holder is preferably provided with a spring-pressed cover having a lifting thumb piece projecting therefrom and integral therewith, said thumb-piece being ribbed to stiffen and strengthen the same.

In the accompanying drawings Figure 1 is a perspective view of the improved holder, Fig. 2 is a horizontal section of the same on line 2—2, Fig. 1, and Fig. 3 is a detail view of the cover.

Referring to the drawings, 12 denotes the body of the holder which is formed from a single piece or strip of sheet metal the ends of which are clenched or seamed together, as at 13. The edge of the piece or strip is turned inward at the bottom of the holder to form an inwardly extending and practically continuous flange 14 which will support the removable paper receptacle. The overlapping corner portions of the said flange are preferably secured together by "self-formed" rivets 15 made by punching, and the joining parts at the seam 13 are preferably similarly secured together, as by "self-formed" rivets 16.

The holder is provided with a handle 17 integral therewith, said handle being formed by partly cutting out a part of one wall of the holder and rolling over the edges of the part thus cut out to form a rounded strengthening rib 18 at the edges and lower end of the handle, said rounded rib permitting the handle to be firmly grasped without danger of injuring or cutting the fingers of the user. The point of connection of the integral handle with the body of the holder is preferably stiffened and strengthened by struck-up ribs 19. This method of forming the handle by striking the same out of one wall of the holder leaves an opening in said wall with the integral handle connected to said wall at one edge of said opening.

The rear wall of the holder is preferably (but not necessarily) made somewhat higher than the other walls, for the convenient removal of the paper receptacle, and to the said rear wall is attached, by a suitable hinge, the cover 20 having an integral thumb-piece 21 by which it can be conveniently lifted against the action of gravity, assisted by a closing spring 22. The projecting end of the thumb-piece 21 is preferably rounded, as shown, and the said thumb-piece is preferably stiffened by longitudinal struck-up ribs 23.

From the foregoing it will be understood that the improved holder consists of a body portion and a cover each of which, with its handle and thumb-piece, is formed of a single piece of thin sheet metal, so that the holder may be made at the least possible expense, thereby economizing cost in manufacture.

Having thus described my invention I claim and desire to secure by Letters Patent:

1. A cuspidor holder or frame, of rectangular form, adapted to contain a cup or receptacle, and having an integral handle, an open bottom and a supporting flange extending inward around said bottom, said holder or frame, flange, handle and all, consisting of a single piece of thin sheet metal.

2. A cuspidor holder or frame, of rectangular form, adapted to contain a cup or receptacle and having an integral handle, an open bottom and a supporting flange extending inward around said bottom, said holder or frame, flange, handle and all, consisting of a single piece of thin sheet metal, said holder or frame being provided with a hinged cover having an integral, ribbed thumb-piece.

In testimony whereof I affix my signature, in presence of two witnesses.

HENRY C. LOVIS.

Witnesses:
WM. J. SAWYER,
H. B. WRIGHT.

Copies of this patent may be obtained for five cents each, by addressing the "Commissioner of Patents, Washington, D. C."